United States Patent [19]
Golla et al.

[11] Patent Number: 5,898,864
[45] Date of Patent: Apr. 27, 1999

[54] METHOD AND SYSTEM FOR EXECUTING A CONTEXT-ALTERING INSTRUCTION WITHOUT PERFORMING A CONTEXT-SYNCHRONIZATION OPERATION WITHIN HIGH-PERFORMANCE PROCESSORS

[75] Inventors: Robert Thaddeus Golla, Plano; James Allan Kahle, Austin; Albert John Loper, Cedar Park; Soummya Mallick, Austin, all of Tex.

[73] Assignee: International Business Machines Corporation, Armonk, N.Y.

[21] Appl. No.: 08/918,059

[22] Filed: Aug. 25, 1997

Related U.S. Application Data

[63] Continuation of application No. 08/533,047, Sep. 25, 1995, abandoned.

[51] Int. Cl.$^6$ .................................................. G06F 9/44
[52] U.S. Cl. ........................ 395/569; 395/570; 395/740
[58] Field of Search .................................... 395/569, 570, 395/740

[56] References Cited

U.S. PATENT DOCUMENTS

| | | | |
|---|---|---|---|
| 4,531,185 | 7/1985 | Halpern et al. | 395/553 |
| 5,016,166 | 5/1991 | Van Loo et al. | 395/674 |
| 5,057,997 | 10/1991 | Chang et al. | 395/678 |
| 5,127,098 | 6/1992 | Rosenthal et al. | 711/202 |
| 5,269,017 | 12/1993 | Hayden et al. | 395/182.13 |
| 5,293,613 | 3/1994 | Hayden et al. | 395/182.13 |
| 5,313,634 | 5/1994 | Eickemeyer | 395/587 |
| 5,335,331 | 8/1994 | Murao et al. | 395/389 |
| 5,384,906 | 1/1995 | Horst | 395/553 |
| 5,392,421 | 2/1995 | Lennartsson | 395/551 |
| 5,394,529 | 2/1995 | Brown, III et al. | 395/587 |
| 5,428,779 | 6/1995 | Allegrucci et al. | 395/678 |
| 5,454,087 | 9/1995 | Narita et al. | 395/587 |
| 5,522,053 | 5/1996 | Yoshida et al. | 711/213 |
| 5,530,825 | 6/1996 | Black et al. | 711/213 |
| 5,535,397 | 7/1996 | Durante et al. | 395/740 |
| 5,550,993 | 8/1996 | Ehlig et al. | 395/570 |
| 5,598,546 | 1/1997 | Blomgren | 395/385 |

OTHER PUBLICATIONS

IBM Technical Disclosure Bulletin, vol. 31, No. 4, Sep. 1988, "Fast Parallel Processor Notification".

*Primary Examiner*—Kenneth S. Kim
*Attorney, Agent, or Firm*—Casimer K. Salys; Antony P. Ng; Andrew J. Dillon

[57] ABSTRACT

A method and system for executing a context-altering instruction within a processor are disclosed. The processor has a superscalar architecture that includes multiple pipelines, buffers, registers, and execution units. The processor also includes a machine state register for identifying a context of the processor, and a shadow machine state register in conjunction with the machine state register. During operation, a first state of the machine state register is copied to the shadow machine state register. Instructions are executed in accordance with a context identified by the first state of the machine state register. The first state of the shadow machine state register is subsequently altered to a second state in response to decoding a context-altering instruction. The context-altering instruction and subsequent instructions are then executed in accordance with the second state of the shadow machine state register. Finally, the first state of the machine state register is altered to the second state in response to a completion of the context-altering instruction. As a result context synchronization operations are avoided.

12 Claims, 6 Drawing Sheets

| | CYCLE 1 | CYCLE 2 | CYCLE 3 | CYCLE 4 | CYCLE 5 |
|---|---|---|---|---|---|
| | Instr_1 fetch | Instr_2 fetch | Instr_3 fetch | Instr_4 fetch | Instr_5 fetch |
| | | Instr_1 decode | Instr_2 decode | Instr_3 decode | Instr_4 decode |
| | | | Instr_1 completion | Instr_2 completion | Instr_3 completion |
| CONTEXT IN SHADOW MSR | 1 | 0 | 0 | 0 | 0 |
| CONTEXT IN MSR | 1 | 1 | 0 | 0 | 0 |

*Fig. 3b*

METHOD AND SYSTEM FOR EXECUTING A CONTEXT-ALTERING INSTRUCTION WITHOUT PERFORMING A CONTEXT-SYNCHRONIZATION OPERATION WITHIN HIGH-PERFORMANCE PROCESSORS

This is a continuation, of application Ser. No. 08/533,047, filed Sep. 25, 1995, now abandoned.

BACKGROUND OF THE INVENTION

1. Technical Field

The present invention relates to a method and system for improving data processing in general, and in particular, to an improved method and system for executing instructions within a processor. Still more particularly, the present invention relates to an improved method and system for executing context-altering instructions within a processor without context synchronization.

2. Description of the Related Art

A "context" is the environment (e.g. privilege or relocation) in which a program executes and it is generally controlled by the content of certain system register (e.g. machine state register) within a processor. Context-altering instructions are a class of instructions that change the context of the processor in which data addresses or instruction addresses are interpreted, or in which instructions are executed. They include system calls, traps, return-from-interrupt, etc. Such instructions can be very useful because they allow an application program to request services from the operating system by means of system call or conditional trap; and after completion of these services or after time-sliced out, the control is returned back to the application program via return-from-interrupt.

However, the processor time overhead for executing context-altering instructions is also very high because a context synchronization must be preformed after each execution of context-altering instructions. The context synchronization operation allows any instruction that follows to be fetched and executed in the context established by the operation. This requirement dictates that any pre-fetched instruction be discarded, which in turn requires that any result of speculative execution also be discarded. Further, the serialized fashion of instruction execution does not take advantage of the pipelined architecture of the processor and incidentally poses a huge time penalty for executing context-altering instructions. A superscalar pipelined processor achieves its high instruction throughput by fetching and dispatching multiple instructions in a single machine cycle, and typically fetches instructions ahead of the instructions currently being executed in order to avoid delay. However, as a result of a context synchronization operation after the execution of a context-altering instruction, all the pre-fetched instructions subsequent to the context-altering instruction must be discarded and need to be re-fetched. This problem can be better illustrated with a diagram. FIG. 3a is an illustration of a three level pipeline. Instr_1 is a context-altering instruction and the context of the processor is changed from "1" to "0" at the completion cycle of Instr_1 in cycle 3. If the instructions subsequent to Instr_1, such as Instr_2, Instr_3, etc., cannot be run in context "0", they will all have to be discarded during the context synchronization and need to be re-fetched for decoding under context "0". This problem is even more prominent in processors that utilize parallel pipelines because many more pre-fetched instructions will be discarded.

Consequently, it would be desirable to provide a method for executing these context-altering instructions efficiently by avoiding subsequent delays in machine cycle time due to unnecessary discarding of pre-fetched instructions.

SUMMARY OF THE INVENTION

It is therefore an object of the present invention to provide an improved method and system for data processing.

It is another object of the present invention to provide an improved method and system for executing context-altering instructions within a processor.

It is yet another object of the present invention to provide an improved method for executing context-altering instructions within a processor without context synchronization.

In accordance with the present invention, a processor is provided which has multiple numbers of buffers for storing instructions, multiple numbers of registers and multiple numbers of execution units for executing instructions. Each instruction includes an associated context indicator which is attached during the decode cycle of a preceding instruction. Each context indicator is then utilized to identify the context-altering or non-context-altering nature of the preceding instruction. For each context-altering instruction, the processor determines whether a target address can be determined. If the target address can be determined, then the processor computes the target address, otherwise, the processor computes a speculative target address. The context-altering instruction is then executed. If a speculative target address has been utilized, a determination must be made whether or not the speculative target address is correct. If the speculative target address is correct, the next instruction is executed, otherwise, a correct target address must be fetched. By utilizing the method and system of the present invention, a context-altering instruction can be executed without requiring a context synchronization operation. This technique avoids any unnecessary discarding of pre-fetched instructions subsequent to a context-altering instruction, which may be required by the context synchronization operation and hence, a context-altering instruction can be executed more efficiently in a pipelined processor.

All objects, features, and advantage of the present invention will become apparent in the following detailed written description.

DESCRIPTION OF THE DRAWINGS

The invention itself as well as a preferred mode of use, further objects and advantage thereof, will best be understood by reference to the following detailed description of an illustrative embodiment when read in conjunction with the accompanying drawings, wherein:

FIG. 3b is a pictorial diagram of a three level pipeline illustrating the context change within a state register and within a shadow state register, according to a preferred embodiment of the invention;

DESCRIPTION OF PREFERRED EMBODIMENT

Figure 1:
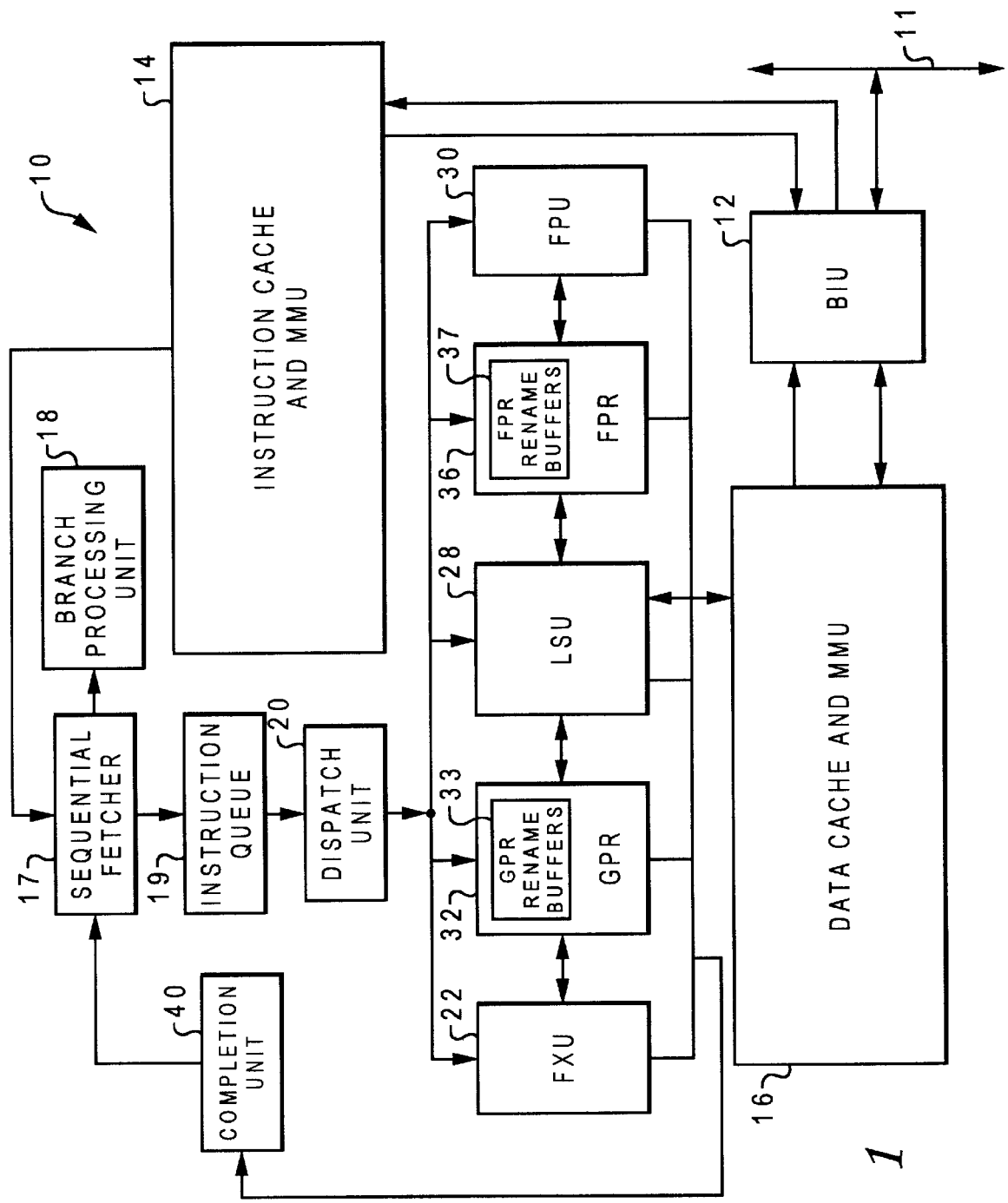
FIG. 1 is a block diagram of a preferred embodiment of a processor which utilizes the method of the present invention.

FIG. 1 is a block diagram of a processor 10 for data processing. In the depicted embodiment, processor 10 comprises a single integrated circuit superscalar microprocessor. Processor 10 includes various registers, buffers, execution units and other functional units, which are all formed by integrated circuitry. In a preferred embodiment of the invention, processor 10 comprises one of the PowerPC™ line of microprocessors manufactured by International Business Machines Corp. of Armonk, N.Y., which operates according to reduced instruction set computing (RISC) techniques. As depicted in FIG. 1, processor 10 is coupled to system bus 11 via a bus interface unit (BIU) 12 within processor 10. BIU 12 controls the transfer of information between processor 10 and other devices coupled to system bus 11, such as a main memory (not shown). Processor 10, system bus 11, and the other devices coupled to system bus 11 together form a host data processing system.

Within processor 10, BIU 12 is connected to instruction cache 14 and data cache 16. Both instruction cache 14 and data cache 16 are high speed caches which enable processor 10 to achieve a relatively fast access time to a subset of instructions or data previously transferred from main memory to caches 14 and 16, thus improving the speed of operation of the host data processing system. Instruction cache 14 is further coupled to sequential fetcher 17 which fetches instructions from instruction cache 14 during each execution cycle. Sequential fetcher 17 transmits branch instructions fetched from instruction cache 14 to branch processing unit (BPU) 18 for execution, but temporarily stores sequential instructions within instruction queue 19 for later execution by other execution circuitry within processor 10.

In addition to BPU 18, the execution circuitry of processor 10 includes three execution units, namely, fixed-point unit (FXU) 22, load/store unit (LSU) 28, and floating-point unit (FPU) 30. It is well-known to those-skilled in the computer arts that each of the three execution units can execute one or more classes of instructions, and all execution units operate concurrently during each processor cycle. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33 which provide temporary storage for the data results until the instruction is completed before transferring the data results from GPR rename buffers 33 to at least one of the GPRs 32. Conversely, FPU 30 performs floating-point operations, such as floating-point multiplication and division, on source operands received from floating-point registers (FPRs) 36 or FPR rename buffers 37. FPU 30 outputs data resulting from the execution of floating-point instructions to selected FPR rename buffers 37 which temporarily store the data results until the instructions are completed before transferring the data results from FPR rename buffers 37 to selected FPRs 36. As its name implies, LSU 28 executes floating-point and fixed-point instructions which either load data from memory (i.e., either data cache 16 or main memory) into selected GPRs 32 or FPRs 36 or which store data from a selected one of GPRs 32, GPR rename buffers 33, FPRs 36, or FPR rename buffers 37 to memory.

Processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. Similar to any high-performance processor, processor 10 processes each instruction in five distinct pipeline stages—fetch, decode/dispatch, execute, finish and completion/writeback, though some pipeline stages can be reduced or combined in certain design implementations.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. In contrast, sequential fetcher 17 removes branch instructions from the instruction stream and forwards them to BPU 18 for execution. BPU 18 includes a branch prediction mechanism, which in a preferred embodiment comprises a dynamic prediction mechanism such as a branch history table, that enables BPU 18 to speculatively execute unresolved conditional branch instructions by predicting whether or not the branch will be taken.

During the decode/dispatch stage, dispatch unit 20 decodes and dispatches one or more instructions from instruction queue 19 to one of the appropriate execution units 22, 28, and 30. Also during the decode/dispatch stage, dispatch unit 20 allocates a rename buffer within GPR rename buffers 33 or FPR rename buffers 37 for the data result of each dispatched instruction.

During the execute stage, execution units 22, 28, and 30, execute instructions received from dispatch unit 20 opportunistically as operands and execution resources for the indicated operations are available. Each of the execution units 22, 28, and 30 are equipped with a reservation table that stores dispatched instructions for which operands or execution resources are unavailable.

After execution has terminated, execution units 22, 28, and 30 store data results within either GPR rename buffers 33 or FPR rename buffers 37, depending upon the instruction type. Then, execution units 22, 28, and 30 signal completion unit 40 that the execution unit has finished an instruction. Finally, instructions are completed in program order by transferring result data from GPR rename buffers 33 or FPR rename buffers 37 to GPRs 32 or FPRs 36, respectively.

Figure 2:
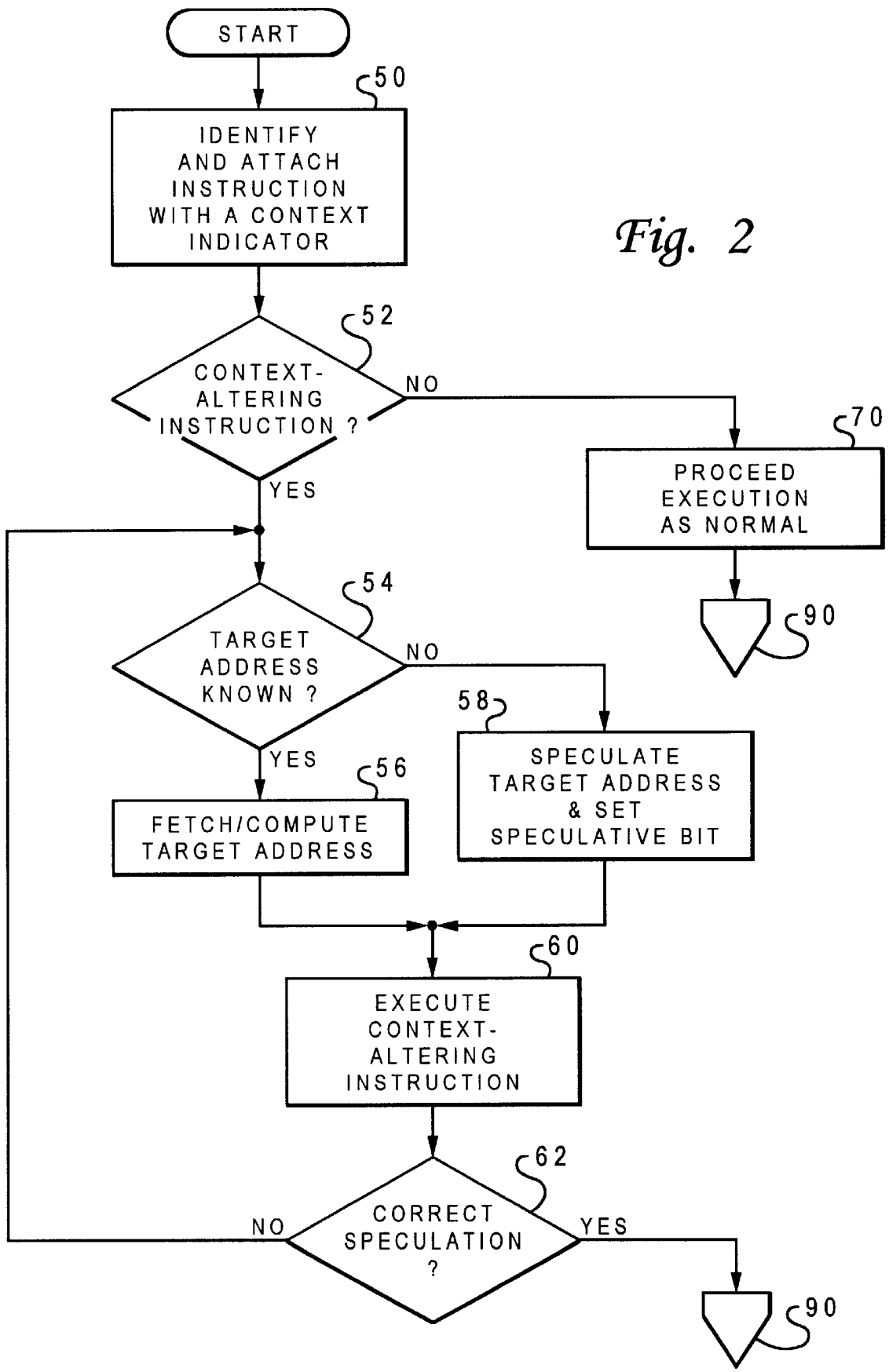
FIG. 2 is a high level logic flowchart illustrating the method of executing context-altering instructions within a processor without context synchronization according to a preferred embodiment of the invention.
Figure 3A:
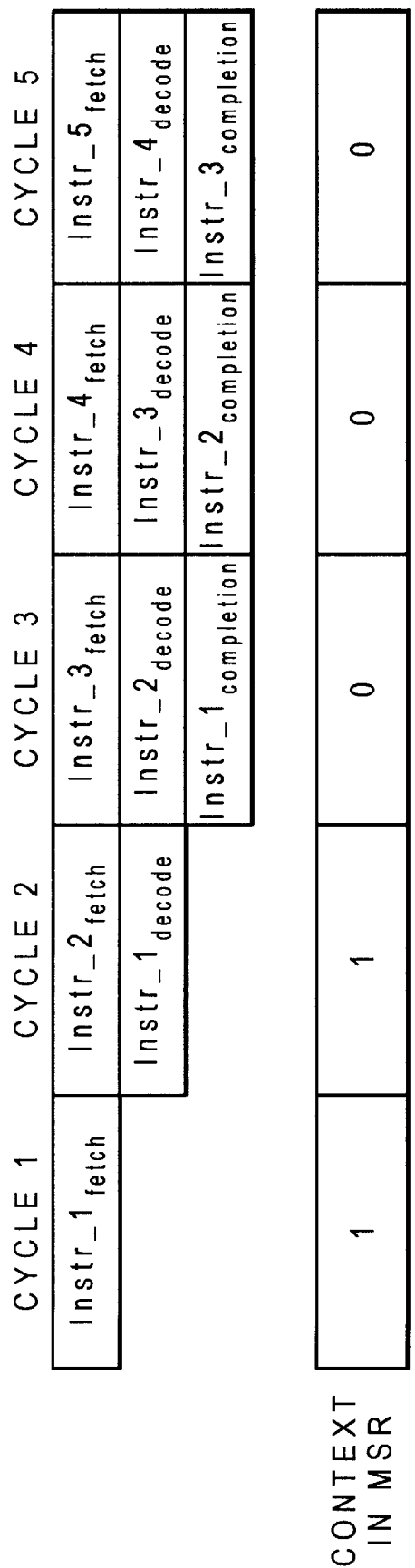
FIG. 3a is a pictorial diagram of a three level pipeline illustrating the context change within a state register during the execution of a context-altering instruction.

FIG. 2 is a high level logic flowchart illustrating the preferred embodiment of the invention. Starting at block 50, the nature of an instruction, as to whether or not it is context-altering, is first identified during its decode stage. The result of this determination is then put in the form of a context indicator and is attached to the succeeding instruction in the pipeline to be executed immediately after. There are only two kinds of context indicators-one for context-altering instructions and the other for non-context-altering instructions. For example, a context-altering instruction may be signified with a "0" while a non-context-altering instruction may be signified with a "1". As shown in FIG. 3b, Instr__1 is a context-altering instruction. Its context-altering nature is known to the processor during its decode cycle (cycle 2), but the effect of context-altering will not take place until its completion cycle (cycle 3). By taking advantage of the fact that the context-altering nature of Instr__1 is known during its decode cycle, such information is attached to Instr_2 before the actual context change in the completion cycle of Instr_1 (cycle 3). The implementation of the attachment can be in the form of, for example, a shadow machine state register (MSR), in consistent with the fact that the context information is normally stored in the MSR. The context indicator stored in the shadow MSR is important to the present invention because after the subsequent execution of Instr_1, such context will be current for Instr_2's execution without the performance of a context synchronization operation.

Referring again to the high level logic flowchart in FIG. 2 at block 52, a determination is then made as to whether or not the fetched instruction is a context-altering instruction. If the fetched instruction is a non-context-altering instruction, the process proceeds to normal execution of the instruction, as indicated in block 70. The process then terminates at block 90.

In sum, the context alterability of an instruction is first identified during its decode cycle. This information is then attached to the succeeding instruction in the pipeline via a context indicator. If the instruction is a non-context-altering instruction, proceed to its execution as normal.

However, if the instruction is a context-altering instruction, then, at block 54, a determination is made as to whether or not the target address of the context-altering instruction can be determined. Examples of context-altering instruction with a target address that can be determined are system call (<IP>$^3$OCOO) and return-from-interrupt (address in register SRRO) for the PowerPC™ processor series. If the target address can be determined, then the process computes and fetches that known target address for subsequent execution, as indicated in block 56. However, if the target address of the context-altering instruction cannot be determined, such as in the case of a conditional trap, then a speculative target address is computed by utilizing any speculative look up routine that is well-known to those who are skilled in the art of computer design. In addition, as indicated in block 58, a speculative bit is set to indicate that the target address for the context-altering instruction is a speculative address.

The context-altering instruction is the n executed, as indicated in block 60. After the execution of the context-altering instruction, a determination must be made at block 62, only if the speculative bit has been set, as to whether or not the speculative target address is correctly computed. If the speculative target address is correct, then the speculative bit will be reset and the next instruction will be dispatched and/or executed in the pipeline. The process then terminates at block 90.

Figure 4:
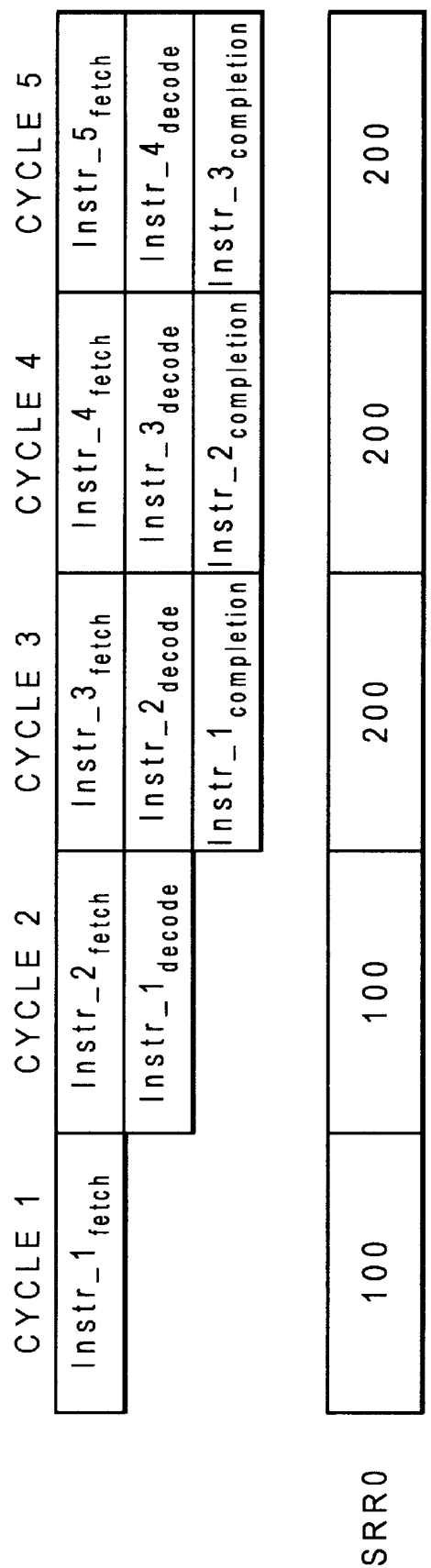
FIG. 4 is a pictorial diagram of a three level pipeline illustrating the contents within the SRRO register during the execution of a context-altering instruction.

However, if the speculative target address is incorrect, then the process returns to block 54 and all subsequent instructions in the pipeline must be discarded. This can be better illustrated with a diagram. FIG. 4 is a diagram of a three level pipeline with address 100 initially stored in SRRO. Instr_1 is an instruction for putting an address 200 to SRRO, Instr_2 is the return-from-interrupt instruction and Instr_3 is an add instruction. After the completion of Instr_1 in cycle 3, the address value in SRRO is changed from 100 to 200 in cycle 3. The address value stored in SRRO is the memory location for the program pointer to go to for the subsequent execution of the program. Because this target address would not normally be known to the application program before the execution of the context-altering instruction, a speculative target address was computed and fetched. The determination step of whether or not the speculative target address is correct, as indicated in block 62 of FIG. 2, is performed in cycle 3 after the completion of Instr_3. At this point, if the fetched speculative target address is not the same as the one stored in SRRO, then Instr_3 and subsequent instructions will be discarded as a result.

After returning to block 54, the target address will be available in the register at this time and no further computation of a speculative target address will be necessary. Hence, the process will proceed down the path of a known target address for the context-altering instruction as mentioned above. Finally, the process terminates at block 90.

Figure 5:
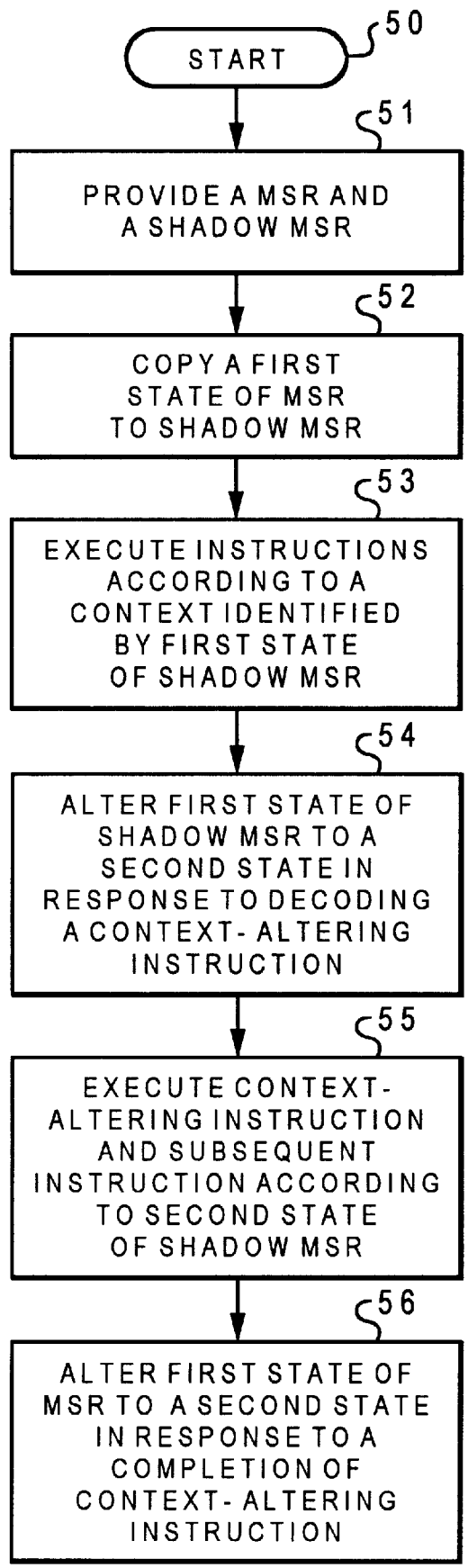
FIG. 5 is a high-level logic flow diagram of a method for executing a context-altering instruction within a processor, in accordance with a preferred embodiment of the present invention.

Referring now to FIG. 5, there is illustrated a high-level logic flow diagram of a method for executing a context-altering instruction within a processor, in accordance with a preferred embodiment of the present invention. Starting at block 50, a machine state register and a shadow machine state register are provided within a processor, as shown in block 51. The processor preferably identifies a context by reference to either the machine state register or the shadow machine state register. A first state of the machine state register is then copied to the shadow machine state register, as depicted in block 52. Subsequently, instructions are executed according to a context identified by the first state of the shadow machine state register, as illustrated in block 53. In response to decoding a context-altering instruction, the first state of the shadow machine state register is altered to a second state, as shown in block 54. Thereafter, the context-altering instruction and any subsequent instructions are executed according to the second state of the shadow machine state register, as depicted in block 55. Finally, in response to a completion of the context-altering instruction, the first state of the machine state register is altered to the second state, as illustrated in block 56. As a result, context synchronization operations can be avoided.

As has been described, the present invention provides a method and system for executing a context-altering instruction without requiring a context synchronization operation. By the utilization of a context indicator attaching to a succeeding instruction, this invention allows context-altering instructions to be executed more efficiently in a pipelined processor and avoids any unnecessary discarding of pre-fetched instructions subsequent to a context-altering instruction, which may be required by a context synchronization operation.

While the invention has been particularly shown and described with reference to a preferred embodiment, it will be understood by those skilled in the art that various changes in form and detail may be made therein without departing from the spirit and scope of the invention.

What is claimed is:

1. A method for executing a context-altering instruction within a processor, said method comprising the steps of:

providing a machine state register and a shadow machine state register in said processor, wherein said processor identifies a context by reference to one of said machine state register and said shadow machine state register;

copying a first state of said machine state register to said shadow machine state register;

executing instructions in accordance with a context identified by said first state of said shadow machine state register;

altering said first state of said shadow machine state register to a second state in response to decoding a context-altering instruction;

thereafter, executing said context-altering instruction and any subsequent instructions in accordance with said second state of said shadow machine state register; and altering said first state of said machine state register to said second state in response to a completion of said context-altering instruction, such that context synchronization operations are avoided.

2. The method according to claim 1, wherein said method further includes steps of altering said second state of said shadow machine state register to said first state in response to decoding a second context-altering instruction, and thereafter, executing said second context-altering instruction and any subsequent instructions in accordance with said first state of said shadow machine state register.

3. The method according to claim 1, wherein said first state is a logical "1."

4. The method according to claim 1, wherein said second state is a logical "0."

5. A processor capable of executing context-altering instructions, said processor comprising:
   a machine state register and a shadow machine state register, wherein said processor identifies a context by reference to one of said machine state register and said shadow machine state register;
   means for copying a first state of said machine state register to said shadow machine state register;
   means for executing instructions in accordance with a context identified by said first state of said shadow machine state register;
   means for altering said first state of said shadow machine state register to a second state in response to decoding a context-altering instruction;
   means for executing said context-altering instruction and any subsequent instructions in accordance with said second state of said shadow machine state register; and
   means for altering said first state of said machine state register to said second state in response to a completion of said context-altering instruction, such that context synchronization operations are avoided.

6. The processor for executing context-altering instructions according to claim 5, wherein said processor further includes means for altering said second state of said shadow machine state register to said first state in response to decoding a second context-altering instruction and means for executing said second context-altering instruction and any subsequent instructions in accordance with said first state of said shadow machine state register.

7. The processor according to claim 5, wherein said first state is a logical "1."

8. The processor according to claim 5, wherein said second state is a logical "0."

9. A data processing system, comprising:
   a memory;
   a processor capable of executing context-altering instructions, including:
      a machine state register and a shadow machine state register, wherein said processor identifies a context by reference to one of said machine state register and said shadow machine state register;
      means for copying a first state of said machine state register to said shadow machine state register;
      means for executing instructions in accordance with a context identified by said first state of said shadow machine state register;
      means for altering said first state of said shadow machine state register to a second state in response to decoding a context-altering instruction;
      means for executing said context-altering instruction and any subsequent instructions in accordance with said second state of said shadow machine state register; and
      means for altering said first state of said machine state register to said second state in response to a completion of said context-altering instruction, such that context synchronization operations are avoided.

10. The data processing system according to claim 9, wherein said processor further includes means for altering said second state of said shadow machine state register to said first state in response to decoding a second context-altering instruction and means for executing said second context-altering instruction and any subsequent instructions in accordance with said first state of said shadow machine state register.

11. The data-processing system according to claim 9, wherein said first state is a logical "1."

12. The data-processing system according to claim 9, wherein said second state is a logical "0."

* * * * *